United States Patent [19]

Huang

[11] Patent Number: 5,069,611
[45] Date of Patent: Dec. 3, 1991

[54] VERTICALLY-MOVABLE BLOW MOLDING APPARATUS

[76] Inventor: Ing-Chung Huang, No. 15 Reh-Her 1st Street, Kaohsiung, Taiwan, China

[21] Appl. No.: 481,908

[22] Filed: Feb. 20, 1990

[51] Int. Cl.$^5$ .............................................. B29C 49/04
[52] U.S. Cl. .................................... 425/90; 264/514; 264/520; 425/532; 425/535; 425/538
[58] Field of Search ................. 425/90, 522, 526, 527, 425/532, 534, 535, 536, 537, 538, 539, 450.1, 451.9; 264/514, 520

[56] References Cited

U.S. PATENT DOCUMENTS

| 3,635,636 | 1/1972 | Lagoutte | 425/532 |
| 4,468,368 | 8/1984 | Hafele | 425/532 |
| 4,759,703 | 7/1988 | Krebser et al. | 425/90 |

OTHER PUBLICATIONS

DuBois & Pribble, Plastics mold Engineering Handbook, 1978, pp. 386-389.

Primary Examiner—Timothy Heitbrink
Attorney, Agent, or Firm—Kirschstein, Ottinger, Israel & Schiffmiller

[57] ABSTRACT

A vertically movable blow molding arrangement includes a whole set of molds and mold plates, two blowing needle cylinders, a set of oil spraying structures, and a conveying machine. The whole set of molds and mold plates can close or open for receiving, pinching, sealing and inflating a plastic material to shape, and moves up and down vertically between an extrusion head and the conveying machine by means of oil pressure. The whole set of molds and mold plates can automatically inflate the material without air blowing for shaping.

16 Claims, 5 Drawing Sheets

VERTICALLY-MOVABLE BLOW MOLDING APPARATUS

BACKGROUND OF THE INVENTION

Known plastic molding machines shape hollow cylindrical material extruded by an extruder. The material is pinched and sealed inside a mold set. Air is blown into the mold. After cooling, the mold set is opened. Generally, these machines have the following structure.

1. Traditional inclined movement of the mold set. In this producing process, the material from the extruder is pinched in the mold set positioned below the extruder head; then, air is blown into the material through a blowing needle cylinder to inflate the material to the mold shape; and then, the material is cut by a cutter located between the head and the mold set. Then, the mold set is slantingly moved down, and in the meantime, the inflated material is cooled to keep its shape. After the mold set is stopped at its lower position, it is opened to allow removal of the finished product. Then, the mold set is moved up again to the head to repeat the process. This kind of structure has the disadvantages and inconveniences listed below.

A. The material has high viscosity and easily softens due to heat. The material often fuses together inside the mold because of the extremely small hollow space between the upper and the lower layer of the material when it is pinched in the mold set and before the blowing needle cylinder is inserted between the layers to inflate the material. Therefore, it often turns out defective products, and such machines are only suitable for products having a comparatively large hollow space in the mold, not for products having an extremely small hollow space.

B. The material located between the mold set and the head is very soft. Hence, the cut edge cannot be straight and clean when cut off. Also, the cut material can rise upward on the mold, and the risen part has to be dealt with as waste.

C. Its production speed is slow, with many defective products and much waste material.

2. Two mold sets alternately move back and forth. While the front mold set receives, pinches the material and moves backward, the rear mold set opens to discharge the finished product and moves forward in a continuous process. This structure has the drawbacks listed below.

A. The material is cut by a cutter after it is pinched in one of the two mold sets. Hence, the problems of waste and correcting the cut edge still remain.

B. It also uses the blowing needle cylinder. It is impossible to produce products having an extremely small hollow space.

C. The process of pinching material in the molds, cutting and blowing the material are not simply done.

D. The structure of alternative operation of the two mold sets is complicated and high in malfunction.

3. Two mold sets are arranged at the right and the left. When the left set retreats after pinching and cutting the material, the right set advances to pinch and cut the material in an alternating continuous process. This structure is quite similar to that of No. 2. Only the moving direction of the mold sets is altered. Hence, it has the same shortcomings as No. 2 does.

As can be understood from the above description, known plastic molding machines are restricted to produce products having a limited height of the hollow space to avoid waste material being fused together before inflation. A height under 0.2mm has never been found in this kind of product. They have the following common traditional drawbacks.

1. The whole structure is not suitable for vertical movement operation.
2. Cutting must be done before moving the mold set for repetitive action due to the non-vertical movement operation.
3. Hollow molding depends on blowing air in.
4. They are not suitable for making products having a flat hollow space.
5. Frequent collecting of waste material is involved.
6. Lengthening the material is impossible.
7. The side surfaces of the product cannot be glossy and smooth.
8. Every edge of the product is alway round, impossible to be made right-angled.
9. Varied layer thickness of the products cannot be effected and controlled in the producing process.

OBJECTS OF THE INVENTION

This invention relating to a vertically-movable blow molding arrangement has been devised based on many years' experience in making this kind of machine, aiming to have the following objects.

1. To furnish such an arrangement moving vertically and quickly.
2. To furnish a mold set wherein it is possible to automatically mold an inflated hollow space without blowing air in.
3. To make a product having glossy and smooth sides without a seam.
4. To make a product having 1mm height of hollow space.
5. To have a structure for controlling the thickness of both layers of the product.
6. To have a structure for lengthening the material.
7. To have a structure for furnishing the product with a right-angled edge.
8. To have a structure for making products without a side blowing hole.
9. To produce little waste material, and to conveniently collect waste material.

SUMMARY OF THE INVENTION

The vertical moving blow molding arrangement comprises a set of mold plates, a set of molds, two blowing needle cylinders, a set of oil spraying assemblies and a conveying machine as the main parts.

The set of mold plates has a front and a rear mold plate. The front plate is combined with, and moves back and forth along, a piston rod. The rear plate is combined with, and moves back and forth along, two piston rods. The set of molds comprises a front and a rear mold, and two pairs of two side plates, or two hollow plate frames. If the side plates are used in a first embodiment, the blowing needle cylinders are needed to blow air in the material pinched in the molds. If the hollow plate frames are used in a second embodiment, said blowing needle cylinders are unnecessary, because the material pinched in the molds can have its interior air pressure increased by the closing-up molds so that the material is automatically inflated. In the first embodiment, each mold is separated into three sections, an upper, a middle and a lower, and the middle sections are bolted on the inner surfaces of both mold plates. The side plates are fixed on both sides of the inner surfaces of both mold plates. In the second embodiment, each mold is all in one piece, not having three sections as in the first embodiment, and comprises a front and a rear mold and two hollow plate frames having an interior hollow of the same dimension as the front and the rear mold.

In the first and second embodiments, there are several separating pins provided in the surface of each mold, each pin being outwardly urged by springs linked with a hollow screw so that the finished product can be blown off the molds.

In the second embodiment, additionally, a screw hole is provided in either of the front or the rear mold to communicate with the exterior, and a screw is adjustably fitted therein deeply or shallowly so that the inflated material (product) can be formed with a leak hole near the screw hole to leak out the interior air.

The conveying machine, positioned just vertically below the whole set of molds, comprises a plurality of sets of rollers for conveying finished product, water shooting tubes for cooling finished products, and air spraying tubes for blowing the finished product dry. The conveying speed can be altered so that it can be the same as the material entry speed or a little faster before the material goes into the molds so as to lengthen the material and thereby to impart the finished product with different lengths.

DETAILED DESCRIPTION OF THE PREFERRED EMBODIMENTS

Figure 1:
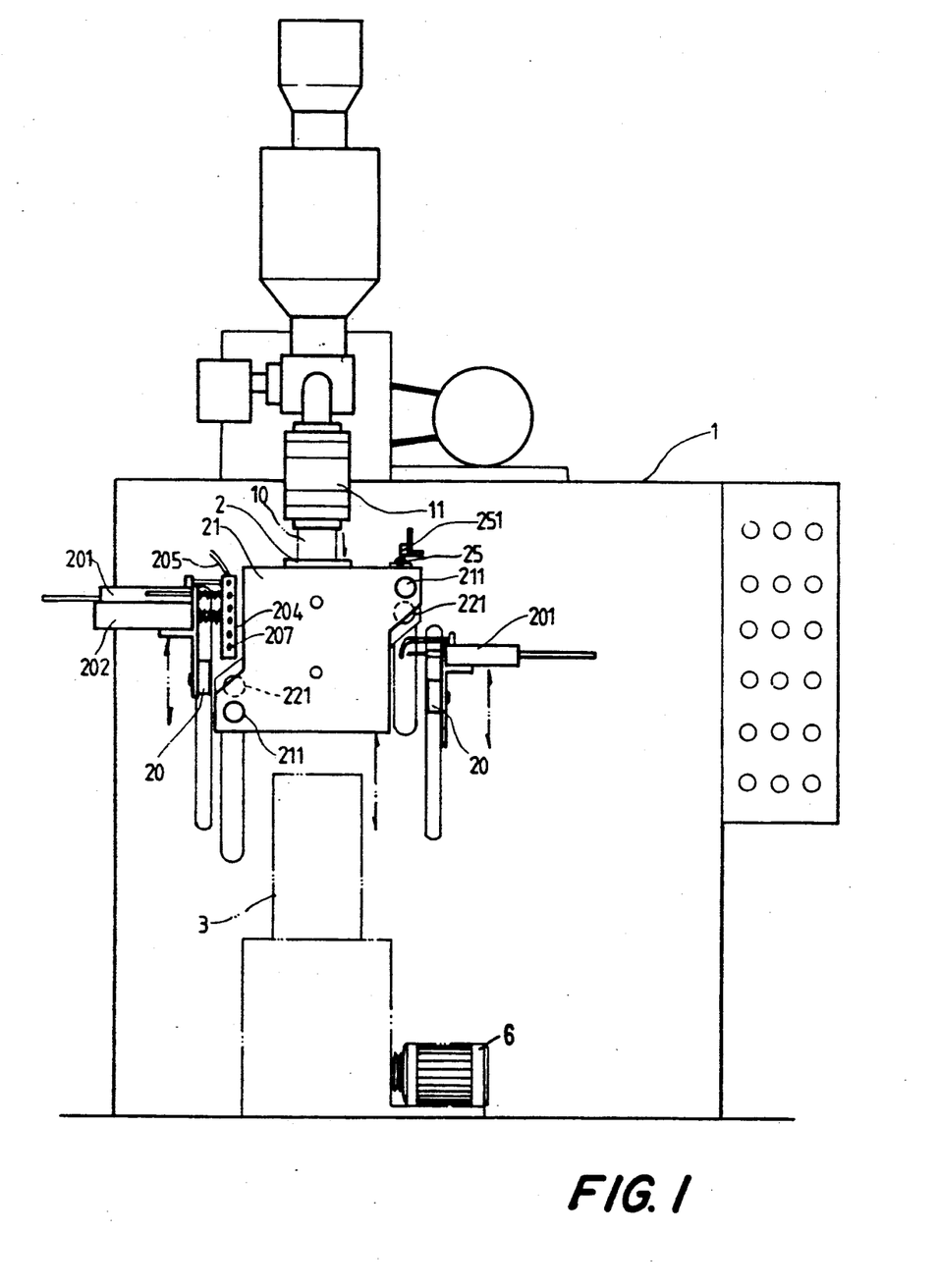
FIG. 1 is an elevational view of a plastic molding machine according to the present invention.

As FIG. 1 shows, the plastic molding machine comprises extruder 1, mold set 2 and conveying machine 3 as the main parts. Extruder 1 has an extrusion head 11 located just above mold set 2, below which is located conveying machine 3. Material 10 extruded out of head 11 goes into mold set 2, which closes to pinch and seal the material for molding. Then, the mold set moves down vertically and opens to let the finished product move down to the conveying machine 3 and be carried away by roller sets therein.

The mold set moves vertically up and down according to the orderly repetitive actions listed below.

1. The open mold set receives the plastic material, closes and moves down vertically as fast as the extruder extrudes the material 10. The material 10 is pinched, inflated and cooled during the downward movement.

2. When the mold set stops at a lower preset position, a separating pin 23 automatically forces the finished product to be discharged from the mold set.

3. The mold set quickly rises and stops at an upper preset position, waiting for the next action.

Conveying machine 3 works according to the following steps.

1. It normally carries the finished product at the same speed as extruder 1 extrudes the material 10.

2. It has four speeds so that it can have the same or a different speed with or from that of the extruder in order to lengthen the material before going into mold set 2.

Figure 2:
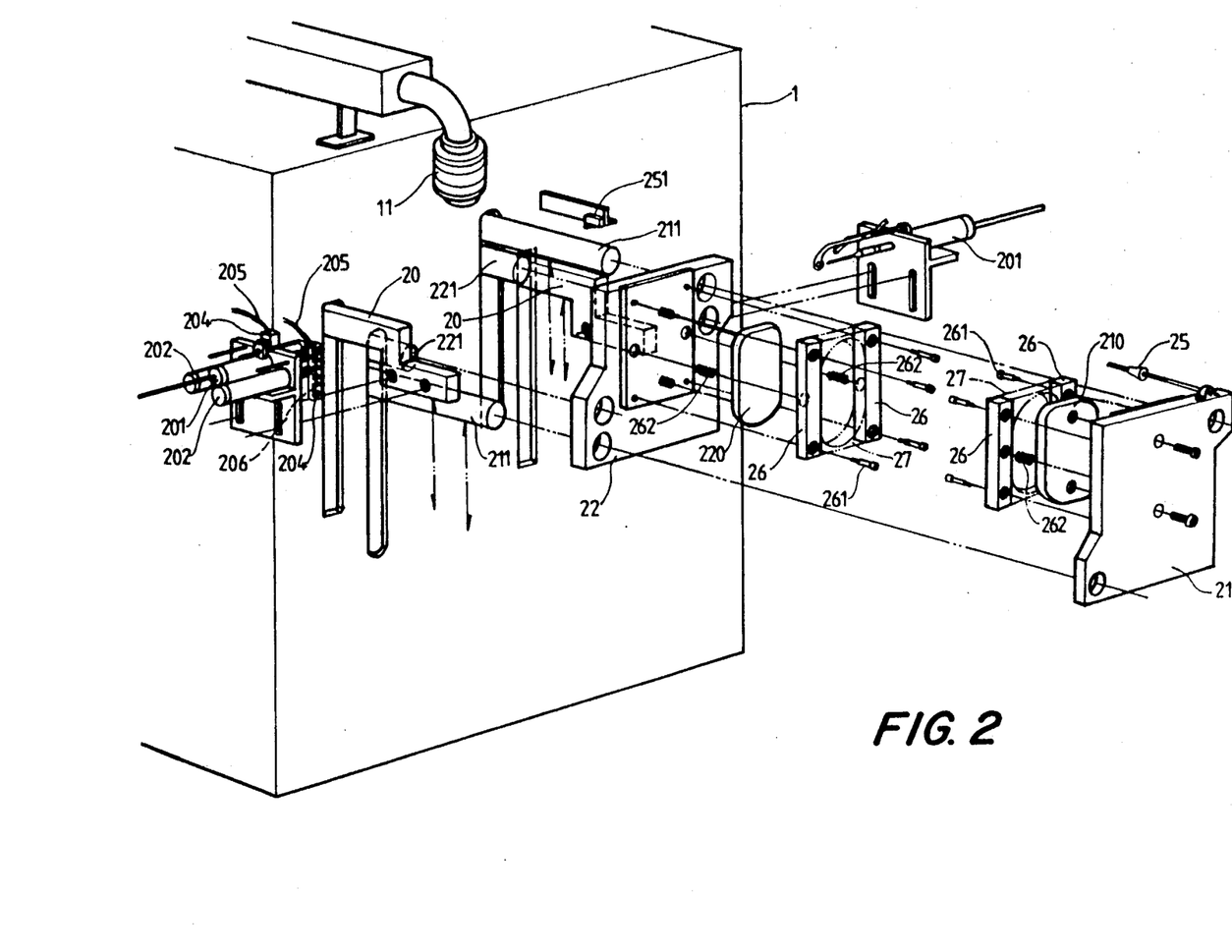
FIG. 2 is an exploded perspective view of a mold set, air blowers and oil spraying structure according to the present invention.

Mold set 2, as shown in FIG. 2, comprises front mold plate 21, rear mold plate 22, front mold 210 and rear mold 220. Front mold plate 21 has two holes for two oil pressure piston rods 211 to extend through and can retract to compress against rear mold plate 22 with the guidance of said rods 211 also extending through two holes in the rear mold plate 22 which is mounted on oil pressure piston rods 22 1 and located just below head 11. Rear mold plate 22 also advances to meet front mold plate 21 for pinching the material.

Oil pressure piston rods 211 and 221 extend out of the machine and can go up or down, which is well-known in the art and is not necessary to describe here. Molds 210 and 220 are removably assembled on the surfaces of front and rear mold plates 21 and 22 respectively. Two arms 20 are mounted adjacent the mold set 2 for mounting two blowing needle cylinders 201 for blowing air into said mold sets 2, and is also known in this art. On one of said arms 20 are mounted two oil pressure cylinders 202, and their piston rods are connected at their front ends with spraying posts 204 connected with oil tubes 205 joined with the inlets of oil passages 206 in spraying posts 204. Oil passage 206 leads to spraying hole 207 at one side of spraying post 204 such that oil can be sprayed out to facilitate the finished product to part from the mold set 2, through said holes 207 by means of said cylinder 202 pushing spraying posts 204 in between said mold set 2 after said mold set opens. Each spraying post 204 sprays in the opposite direction, one into mold 210 and another into mold 220.

Figure 4:
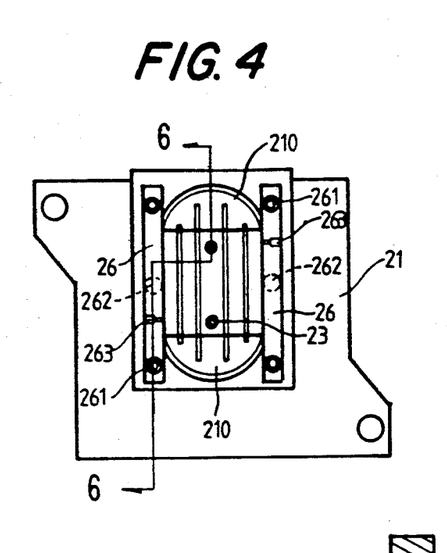
FIGS. 4 and 5 are elevational views of the front and rear of the mold set.
Figure 5:
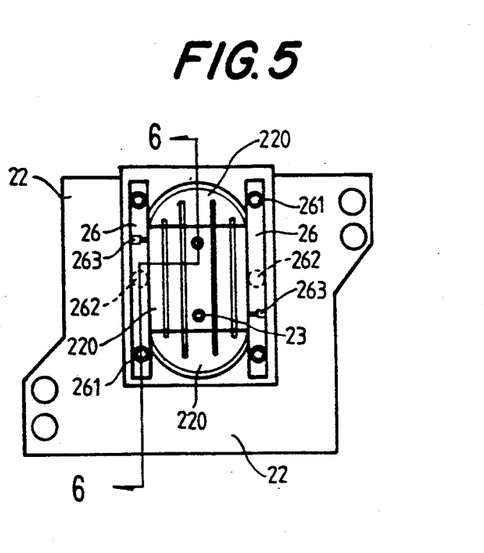
Figure 6:
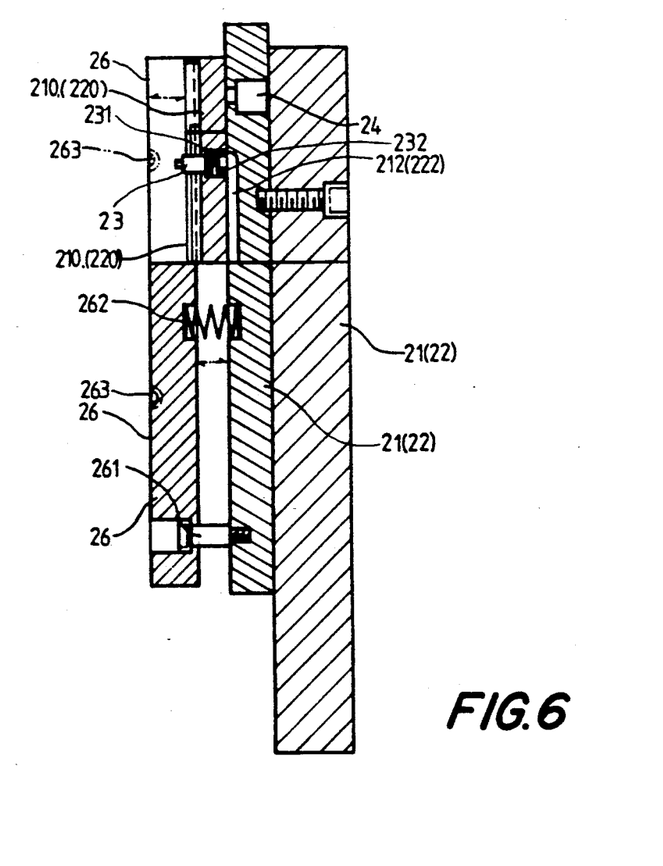
FIG. 6 is a cross-sectional view taken on line 6——6 of FIGS. 4 and 5.
Figure 7:
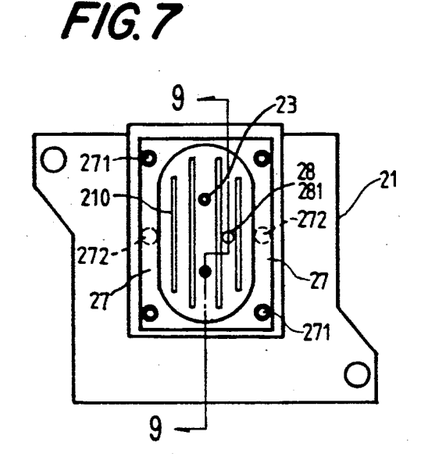
FIGS. 7 and 8 are elevational views of the front and rear of the mold set.
Figure 8:
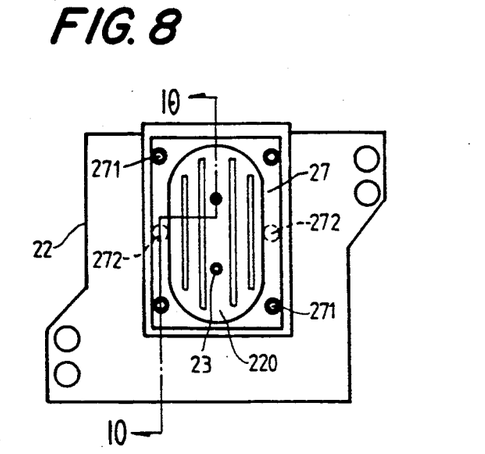
Figure 9:
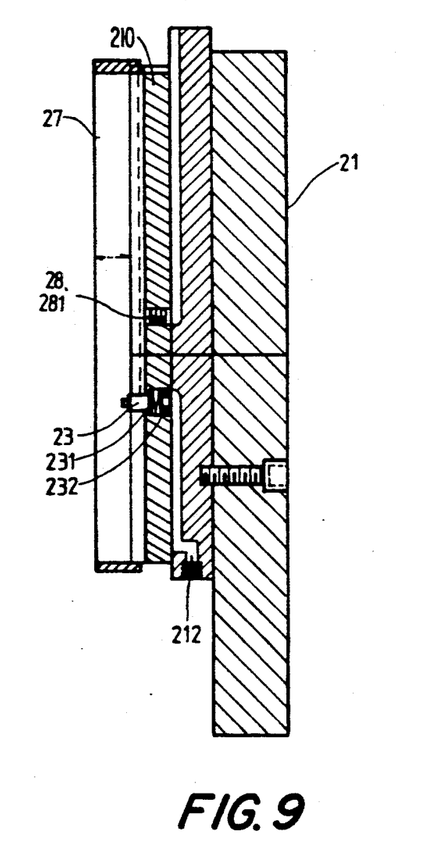
FIGS. 9 and 10 are cross-sectional views taken on lines 9——9 and 10——10 of FIGS. 7 and 8, respectively.
Figure 10:
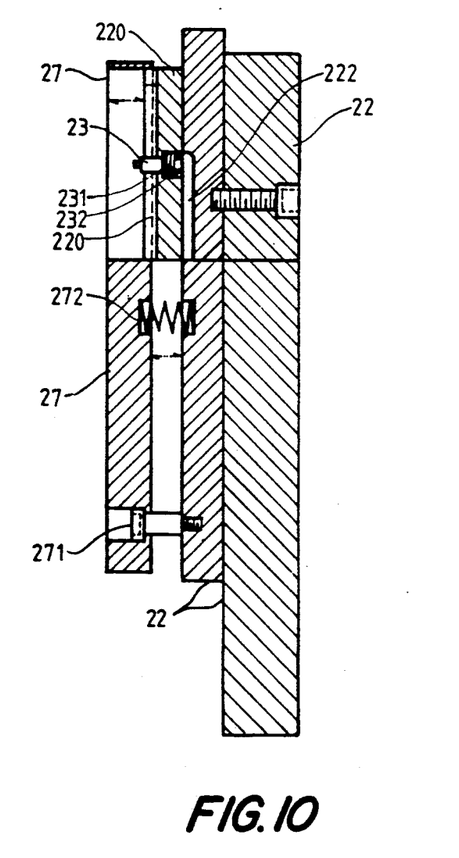

Front and rear mold plates 21 and 22 have a cold water passage, which is also known in the art. Said mold plates 21 and 22 have air passages 212 and 222 to supply air into the front and rear molds 210 and 220 through separating pin 23 to separate the finished product from the mold. FIGS. 4-6 show one embodiment of the mold set for air blowing and FIGS. 7-10 show another embodiment for automatic inflating without air blowing.

Referring to FIGS. 4-6, both front and rear molds 210 and 220 are assembled in the same way; hence, description about their assemblage will be made only for front mold 210. Front mold 210 is separated into three sections, an upper, a middle and a lower. The middle section is bolted with front mold plate 21 and can be separated from the upper and lower section. The movement of front mold 210 is dependent on a pressure cylinder 24, which is controlled in its action by a touch rod 25 moving to touch micro switch 25 1. Front mold 210 is provided with several separating pins 23 penetrating through mold 210 and projecting out of the surface, as shown in FIG. 6, and spring 231 urging the rear end of each pin 23 is stopped at its rear end by hollow screw 232, behind which is the outlet of air passage 212 such that air can be blown through pin 23 into mold 210 to separate the finished product from the mold.

At both sides in the front of mold 210 are positioned two vertical side plates 26 movably bolted on mold plate 21 with bolts 261. A spring 262 is set between each side plate 26 and mold plate 21 to push resiliently said plates 26 to project to the side front of mold 210 when not compressed, and to retract to the same surface as mold 210 when compressed to shorten spring 262. In addition, side plates 26 have through holes 263 at the corresponding points to each blowing needle cylinder 201 for the blowing needle to extend in the mold 210 to blow air into the material to inflate it.

Referring to FIGS. 7-10, the automatic hollow molding mold set has the same pins 23 as in FIGS. 4-6, but hollow plate frames 27 are different from the side plates 26. Hollow plate frames 27 are also movably bolted on mold plates 21 and 22 and can be moved by springs 272. Front and rear molds 210 and 220 are wholly bolted on mold plates 21 and 22, and either of said molds 210 and 220 has screw holes 2 8 communicating with the exterior, and adjusting screw 281 is screwed therein so that the interior air can flow out through the gap between the threaded hold 28 and screw 281.

Figure 3:
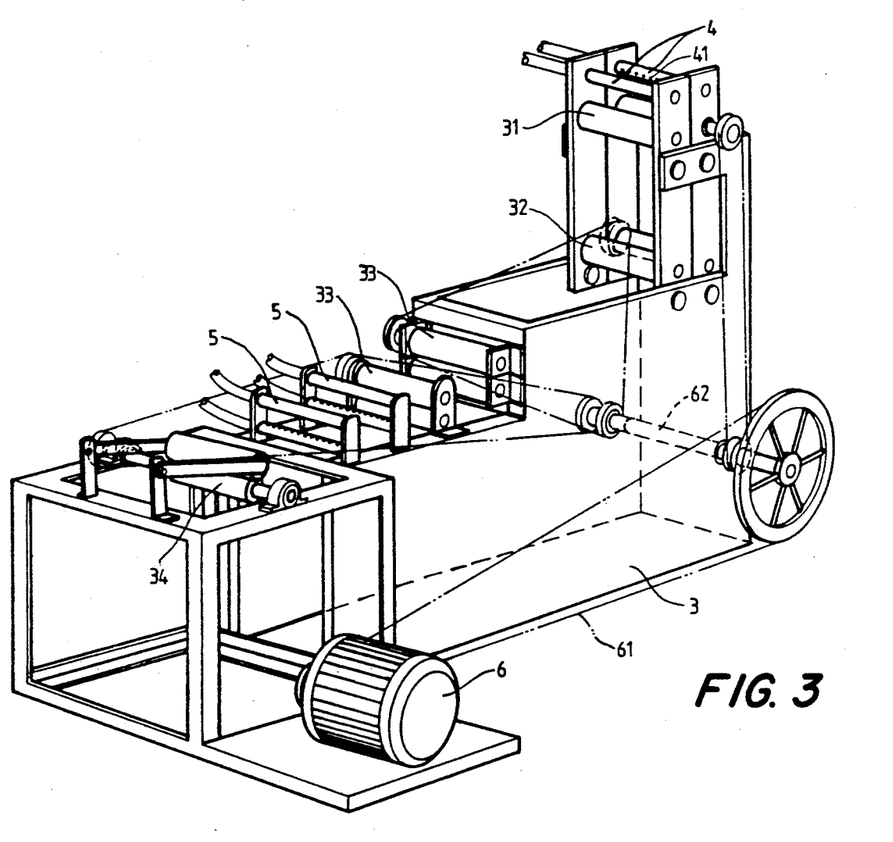
FIG. 3 is a perspective view of a conveying machine according to the present invention.

Next, referring to FIG. 3, conveying machine 3 has more than two roller sets 31, 32, 33, 34 and roller sets 31 and 32 are positioned vertically to receive and pinch finished uncut products. Just above roller sets 31 are fixed two parallel water tubes 4 having a plurality of small holes 41 for water to shoot out to cool finished products to keep their shape. Near roller sets 33 for horizontal conveying are also fixed air shooting tube 5 for blowing products dry, which are conveyed outwardly by roller set 34 to the cutter. The power source of conveying machine 3 is motor 6, which rotates shaft 62 via belt 61 and a belt wheel respectively set at both ends of shaft 62 rotates roller sets 31, 32, 33 and 34 synchronously. Motor 6 can have a variety of speeds by means of a frequency inverter.

The producing process of mold set 2 illustrated in FIGS. 4-10 is described below.

1. For the air blowing mold set in FIGS. 4-6: Initially, extruder 1 extrudes material 10 to the upper preset point between front mold 210 and rear mold 220. When material 10 is extruded to have a preset length by means of timing, both molds 210 and 220 begin to move nearer to each other and, when they come to the preset position, touch rod 25 touches micro switch 251. This then activates pressure cylinder 24 to make the upper and the lower sections of both molds 210 and 220 project outward to seal the upper and the lower ends of the material 10 to be molded. Then both molds 210 and 220 continue to move closer, and side plates 26 at both sides of the molds 210 and 220 come to contact each other.

After that, the closing force of both molds 210 and 220 forces spring 262 to be compressed so that side plates 26 retract until both molds 210 and 220 close up tightly. But before closing up tightly, there is a slack in movement, that is, at the moment both pins 23 in the surfaces of both molds 210 and 220 come to contact with each other, a period of time is preset to slow down closing-up movement, which serves for preventing pins 23 from pricking open material 10 therein.

After closing up of both molds 210 and 220, the whole mold set 2, blowing needle cylinders 201 and the oil spraying structure go down together vertically to the lower preset position sychronously. During this descending movement the molded material is cooled to keep its shape and the conveying machine is also moving at the same time.

Reaching the lower preset position, both molds 210 and 220 stop and open so that the finished product 10 inflated by blowing needle cylinders 201 can be blown separated from the inner surfaces of molds 210 and 220 by help of pins 23 and springs 231. Then, the piston rods extending out of the pressure cylinders 202 move the two oil spraying posts 204 between both molds 210 and 220 for spraying oil on their surfaces. Then, the finished product separated from the molds descends to the conveying machine 3 for conveyance out by roller sets.

When both molds 210 and 220 are opened and ascend to stop at the upper preset position, they remain silent for a preset period of time, i.e. the time needed for extruding one unit of material 10. Then, the producing process mentioned above is repeated.

2. For the automatic hollow molding mold set without blowing air shown in FIGS. 7-10: When extruder 1 finishes extruding one unit of material 10, both molds 10 and 220 immediately move nearer to each other, and both hollow plate frames 27 on both mold plates 21 and 22 first come into contact with each other to confine material 10 in the interior surrounded by said frames 27. Then, further closing movement compresses spring 272 until both molds 210 and 220 enter the hollow section of said frames 27. Then, the whole mold set begins to descend vertically. Meanwhile, the material 10 pinched in the mold is sealed at the upper and the lower end and confined in the limited space formed by said frames 27. The atmospheric pressure in the material can be increased several times, because the space between both molds 210 and 220 decreases as the result of the closing movement of both molds 210 and 220 based on the principle of $P \cdot V = P \cdot V$. Therefore, the high air pressure caused in the material 10 can inflate it to the circumferential surfaces of both molds 210 and 220 and the inflated material can be cooled to hold its inflated shape by low temperature coming from both mold plates 21, 22. After the whole mold set reaches the lower preset position, the mold set opens. The high pressure in material 10 is used for inflating material 10 itself, and partly 1=t out by adjusting screw 2 81. Also, adjusting screw 281 can be adjusted in position to prick a hole in material 10 so that the size of said hole can be preset by adjusting said screw 281 deeply or shallowly and thereby the volume of high air pressure to be let out can be preset. In addition, the surface tension of material 10 and the adjustment of said screw 281 in screw hole 28 have interrelation.

When the mold set opens, pins 23 can be pushed out to separate the finished product from the mold set. Then, oil can be sprayed onto the surfaces of molds 210 and 220 from oil spraying posts 204 projected out by pressure cylinders 202. After that, the whole mold set and the oil spraying structure go up to the upper preset position, and stay silent for the preset period of time waiting for one unit of the material to be extruded, and the same producing process is to be repeated again and again. Products having 1mm height of hollow space can be made by this automatic molding mold set without air blowing.

Conveying machine 3 can have at least four kinds of speed automatically altered by a frequency inverter as 1. The conveying speed is the same as the extrusion speed of the extruder.

2. The conveying machine normally has the same speed as the extruder, but material 10 just extruded can be lengthened before going into the mold set for the preset short period of time by means of a faster speed of the conveying machine than that of the extruder so that finished products can have better extensibility.

3. The conveying machine can stop at the same time together with the extruder.

As for mold set 2, the number of springs 262 or 272 mounted between mold 21 and side plates 26 or hollow plate frames 27 can be altered depending on the necessity of the products. For example, different resiliency can allow one side of the mold set having a weaker resilient force to retract first so that a product having different thicknesses can be made. Thus, the function of the structure can be adjusted to cope with demands of different products.

Different structures of the mold sets coordinated with the vertical movement can obtain the following functions and characteristics.

A. The air blowing molding mold set.

1. Before the molds close, the side plates come into contact with each other and confine the material within both sides so that finished products have no seam at both sides and the side walls can be glossy and smooth.

2. Both sides of material 10 are confined by the side plates before closing the molds, and its upper and lower ends are sealed by the upper and the lower sections of the molds so that the material becomes a sealed hollow body completely confined in the interior of the molds, and thereby the finished product only has a seam at the upper and the lower end.

3. The vertical movement processing shortens the effective distance so that production is fast and smooth.

4. The vertical movement processing minimizes malfunction.

5. The vertical movement processing can afford the material to be lengthened by means of the various controlled speed of the conveying machine so that the product can have different extensibility.

6. The elasticity or the number of the springs urging the side plates are adjustable so that the molds retract with the same or a different speed so that the product can be made to have a single thickness, symmetrical or asymmetrical, or different thicknesses of the layers.

B. The automatic hollow molding mold set without air blowing.

1. The hollow plate frames first confine the material in the hollow space so that finished product has glossy and smooth sides without any seam or blowing hole.

2. Before finishing molding, the material at first becomes a sealed hollow body confined by the hollow plate frames, and when the molds close, the atmospheric pressure in the material becomes high because of the empty space in the molds, and automatically inflates the material to the inner circumferential surfaces of the molds. The adjusting screw in the through screw hole, having the function of venting the air pressure, and the size of the vent hole preset in advance, can form a hole in the inflated material for venting the inside pressure. Thus, the inflating, venting and shaping processes are performed without using an air blowing device.

3. The inflation of the matrial is obtained by the change of its interior air pressure and then its inside pressure leaks out so that the upper and the lower layer of the material do not fuse together even if its hollow space between both layers should be as small as 1mm high.

4. The vertical movement processing makes the producing action fast and smooth, and its structure is simple and practical to have a low malfunction.

5. The material extruded from the extruder can be lengthened by the various speeds of the conveying machine so that the product can have different extensibility.

6. The number and the resilience of the springs set between the hollow plate frames and the mold plates can be altered so that the product may have a single-side 3D, symmetrical or asymmetrical and different thicknesses of material layers.

In summary, the oil pressure vertical movement of the producing structure in the plastic molding machine proposed by this invention is believed to be novel. The ability to turn out products having glossy smooth seamless sides and super thinness in the hollow space and different extensibility acquired from the material lengthened by different speeds are exclusive features and advantages of this invention. They have been practically proven by the producing structure made according to this invention.

What is claimed is:

1. A vertically-aligned blow molding apparatus for producing hollow molded plastic products, said apparatus comprising:
   (a) an overhead extruder for extruding tubular plastic material along a vertical path;
   (b) a mold assembly below the extruder and reciprocatably movable along the vertical path between an upper loading position and a lower discharge position, said mold assembly including
      (i) a pair of molds reciprocatably displaceable along a horizontal path generally perpendicular to the vertical path toward and away from each other, said molds being initially spaced apart from each other in the upper loading position to receive the tubular plastic material between the spaced-apart molds, said molds thereupon contacting each other in the upper loading position and having inner surfaces bounding an interior mold cavity to shape the tubular plastic material into a hollow molded plastic product, said mold cavity having a periphery,
      (ii) means movable with the mold assembly for sealing the periphery of the mold cavity in the upper loading position, and for maintaining the mold cavity sealed during movement of the mold assembly to the lower discharge position,
      (iii) means movable with the mold assembly for injecting air into the tubular plastic material to inflate the hollow molded plastic product when the mold assembly is in the upper loading position,
      (iv) means movable with the mold assembly for discharging the hollow molded plastic product from the mold cavity in the lower discharge position, and
      (v) means movable with the mold assembly for coating the mold cavity with a release agent after discharge of the hollow molded plastic product; and
   (c) a conveyor having an entry zone in the vertical path below the mold assembly, for conveying the hollow molded plastic product away from the mold assembly.

2. The blow molding apparatus according to claim 1, wherein the molds have outer surfaces respectively connected to support plates, said support plates being connected to rods that move along the vertical path, one of the rods being displaceable relative to the other of the rods along the horizontal path.

3. The blow molding apparatus according to claim 2, wherein each mold has an upper mold section, a lower mold section, and a middle mold section located between the upper and lower mold sections, each middle mold section being fixed to a respective support plate; and wherein the sealing means includes means for pushing the upper mold sections into mutual sealed engagement, and for simultaneously pushing the lower sections into mutual sealed engagement to seal upper and lower peripheral regions of the mold cavity.

4. The blow molding apparatus according to claim 3, wherein the pushing means includes a pressure cylinder and means for actuating the pressure cylinder before the inner surfaces of the molds contact each other.

5. The blow molding apparatus according to claim 4, wherein the actuating means includes a push rod mounted on and movable with one of the support plates, and an electrical switch pushed by the rod, said switch being electrically connected to the pressure cylinder.

6. The blow molding apparatus according to claim 2, wherein the sealing means further includes a pair of side plates resiliently mounted on each support plate at opposite lateral sides of the mold cavity to seal opposite lateral sides of the mold cavity, each side plate being resiliently mounted by a spring.

7. The blow molding apparatus according to claim 6, wherein each spring has a different spring constant.

8. The blow molding apparatus according to claim 1, wherein the coating means includes a plurality of spray nozzles, and means for forcing oil under pressure through the nozzles upon the inner surfaces of the molds.

9. The blow molding apparatus according to claim 2, wherein the sealing means further includes a pair of frames respectively surrounding the molds, said frames being resiliently mounted on each support plate by springs.

10. The blow molding apparatus according to claim 9, further comprising means for venting pressurized air within the mold cavity.

11. The blow molding apparatus according to claim 10, wherein the venting means includes threaded elements mounted on the molds.

12. The blow molding apparatus according to claim 1, wherein the discharging means includes separator pins mounted for movement on the molds to push the hollow molded plastic product out of the mold cavity.

13. The blow molding apparatus according to claim 1, wherein the conveyor includes a plurality of pairs of spaced-apart rollers for conveying the products through the rollers.

14. The blow molding apparatus according to claim 1, further comprising means for wetting the products after discharge from the mold assembly, and means for drying the wet products.

15. The blow molding apparatus according to claim 1, further comprising a motor for operating the extruder to extrude the tubular plastic material at a delivery speed, the motor also operating the discharging means to discharge the hollow molded plastic product at a discharge speed which is equal to said delivery speed.

16. The blow molding apparatus according to claim 1, further comprising a motor for operating the extruder to extrude the tubular plastic material at a delivery speed, the motor also operating the discharging means to discharge the hollow molded plastic product at a discharge speed which is different from said delivery speed.

* * * * *